United States Patent
Kojima (10) Patent No.: US 11,923,135 B2
(45) Date of Patent: Mar. 5, 2024

(54) MAGNETIC CLAMP DEVICE

(71) Applicant: KOSMEK LTD., Kobe (JP)

(72) Inventor: Ryota Kojima, Kobe (JP)

(73) Assignee: KOSMEK LTD. (JP)

( * ) Notice: Subject to any disclaimer, the term of this patent is extended or adjusted under 35 U.S.C. 154(b) by 205 days.

(21) Appl. No.: 17/631,483

(22) PCT Filed: Jul. 16, 2020

(86) PCT No.: PCT/JP2020/027620
§ 371 (c)(1),
(2) Date: Jan. 30, 2022

(87) PCT Pub. No.: WO2021/039179
PCT Pub. Date: Mar. 4, 2021

(65) Prior Publication Data
US 2022/0277876 A1    Sep. 1, 2022

(30) Foreign Application Priority Data
Aug. 29, 2019   (JP) ................................. 2019-156704

(51) Int. Cl.
*H01F 7/04*    (2006.01)
*F16B 2/06*    (2006.01)

(52) U.S. Cl.
CPC ................. *H01F 7/04* (2013.01); *F16B 2/06* (2013.01)

(58) Field of Classification Search
CPC ..... H01F 7/04; H01F 7/00; F16B 2/06; B29C 2045/1746; B29C 45/1744; B29C 33/32; B23Q 3/1546
See application file for complete search history.

(56) References Cited

U.S. PATENT DOCUMENTS

| | | | |
|---|---|---|---|
| 4,090,162 A * | 5/1978 | Cardone | B23Q 3/1546 335/289 |
| 4,777,463 A * | 10/1988 | Cory | B23Q 3/1546 335/289 |

(Continued)

FOREIGN PATENT DOCUMENTS

| | | |
|---|---|---|
| JP | 2001-056010 | 2/2001 |
| JP | 5301117 | 9/2013 |

(Continued)

OTHER PUBLICATIONS

International Search Report dated Oct. 13, 2020 issued in International Application No. PCT/JP2020/027620, 2 pages.

*Primary Examiner* — David M Upchurch
(74) *Attorney, Agent, or Firm* — Merek, Blackmon & Voorhees, LLC (57) ABSTRACT

Provided is a magnetic clamp device having a disassembly structure that is easy to maintain. In the magnetic clamp device 1, a magnetic pole 21 and an alnico magnet 23 each have fastening holes 21*a*, 23*a* that communicate with each other. The cavity portion 31 of the plate body 3 has an opening 33 that penetrates from the bottom surface 32*b* thereof to the back side of the plate body 3. A cap 7 having a base portion 71 having a bolt hole 74 communicating with the fastening holes 21*a*, 23*a* and a flange portion 72 abutting the surface 3*b* of the back side of the plate body 3 is inserted into the opening 33. A bolt 8 inserted into the fastening hole 23*a* of the magnetic pole 21 and the alnico magnet 23 from the front side of a magnetic pad 2 is screwed into a female screw thread 74*a* provided in the bolt hole 74 of the cap 7.

4 Claims, 6 Drawing Sheets

(56) References Cited

U.S. PATENT DOCUMENTS

| | | | |
|---|---|---|---|
| 8,292,276 B2* | 10/2012 | Cardone | B25B 11/002 |
| | | | 335/289 |
| 9,061,400 B1* | 6/2015 | Dai | H01F 7/0252 |
| 10,236,107 B2* | 3/2019 | Choi | H01F 7/1646 |
| 2007/0290780 A1* | 12/2007 | Tiberghien | H01F 7/04 |
| | | | 335/285 |
| 2011/0037547 A1* | 2/2011 | Cardone | B23Q 3/1546 |
| | | | 335/289 |
| 2011/0043310 A1* | 2/2011 | Cardone | B25B 11/002 |
| | | | 335/289 |
| 2014/0361860 A1* | 12/2014 | Choi | H01F 7/04 |
| | | | 335/295 |
| 2020/0156195 A1* | 5/2020 | Huang | B23Q 3/1546 |
| 2021/0046673 A1* | 2/2021 | Akamatsu | B29C 45/84 |
| 2021/0183554 A1* | 6/2021 | Kojima | B29C 33/32 |

FOREIGN PATENT DOCUMENTS

| | | |
|---|---|---|
| JP | 2017-213650 | 12/2017 |
| JP | 2018-112292 | 7/2018 |
| JP | 2019-076981 | 5/2019 |

\* cited by examiner

MAGNETIC CLAMP DEVICE

FIELD OF THE INVENTION

The present invention relates to a magnetic clamp device having a disassembly structure that is easy to maintain.

A magnetic clamp device utilizing magnetic adsorption force is known with respect to mold-fixing of an injection molding machine. The magnetic clamp device is a technique for magnetically fixing a mold by fitting a plate body made of a magnetic body on a platen of the injection molding machine. The plate body is provided with a plurality of magnetic pads. Each magnetic pad has a non-reversible magnet (e.g. neodymium magnet) provided around a magnetic pole and a reversible magnet (e.g. an alnico magnet) located behind the magnetic pole, and can be switched between a magnetic circuit closed in the plate body and a magnetic circuit passing through the mold by controlling a magnetic polarity of the alnico magnet with a coil.

Magnetic clamp devices are generally used to keep the mold clamped and cooled by cooling water until the molded product inside the mold cools and hardens, and adopt a liquid-tight structure in order to prevent corrosion of coils, etc. and short circuit by ingress of cooling water into the magnetic clamp device.

For example, patent literature 1 discloses a liquid-tight magnetic clamp device in which a non-magnetic ring made of brass is arranged on an outer peripheral surface portion of a magnetic pole, and an external peripheral groove to receive an O-ring is provided on an outer peripheral surface of the ring. Patent literature 2 also discloses a magnetic clamp device in which an outer peripheral edge portion of the magnetic pole and an inner peripheral portion of the non-magnetic annulus are screwed together in a male/female thread relationship to fit together, and a sealant is distributed in this fitting part.

PRIOR ART

Patent Literature

Patent literature 1: Japanese Patent No. 5301117
Patent literature 2: Japanese Patent Application Publication No. 2019-76981

DISCLOSURE OF THE INVENTION

Problems to be Solved by the Invention

According to the technologies described in the above patent literatures 1 and 2, O-rings or sealants can improve the liquid tightness of the electrical system such as coils inside the plate body of the magnetic clamp device, but they cannot completely eliminate water ingress over a long period of time, and it is expected that someday maintenance inside the magnetic clamp device will be required.

In the magnetic clamp device of patent literature 1, a central fastening hole (central hole) passing through the magnetic pole and the alnico magnet is provided. A bolt (screw) penetrates the magnetic pole and the alnico magnet from the magnetic pole side through the fastening hole and is screwed to the plate body. In the magnetic clamp device of patent literature 2, on the contrary, a bolt penetrates the plate body and the alnico magnet from the plate body side through the fastening hole and is screwed to the magnetic pole.

Therefore, according to the magnetic clamp devices of patent literatures 1 and 2, it is possible to mechanically separate the magnetic pole from the alnico magnet and the plate body by removing the respective bolts. However, the magnetic force of the neodymium magnet is extremely strong, and it is not easy to pull the magnetic pole off the plate body. The magnetic clamp devices of patent literatures 1 and 2 require a special tool to push the magnetic pole and alnico magnet from the back side of the plate body to the front side of the plate body against the force of the neodymium magnet. In addition, as disclosed in paragraph 0067 of patent literature 2, if extra gaps are filled with synthetic resin sealant as needed, extrusion will be even more difficult.

An object of the present invention is to provide a magnetic clamp device having a disassembled structure that is easy to maintain.

Means to Solve the Problem

In the magnetic clamp device of the present invention, including a plate body of magnetic material with a bottomed cavity portion on the surface, and a magnetic pad disposed in the cavity portion, the magnetic pad having a magnetic pole, a reversible magnet with reversible polarity between the magnetic pole and the bottom of the cavity portion, and a non-reversible magnet between the magnetic pole and an inner circumferential side of the cavity portion, the magnetic pole and the reversible magnet, respectively have fastening holes that communicate with each other, and the cavity portion has an opening that penetrates from the bottom of the cavity portion to the back side of the plate body, and a cap with a base portion that has a bolt hole communicating with the fastening hole and a flange portion that has a contact surface abutting on the back side surface of the plate body is inserted into the opening.

The bolt inserted into the fastening hole of the non-reversible magnet and the magnetic pole from the front side of the magnetic pad is screwed into female thread formed on the bolt hole of the cap. Alternatively, the bolt hole is inserted from the back side of the plate body, and the bolt inserted into the fastening hole of the non-reversible magnet and the bolt hole from the flange portion side of the cap is screwed into the female thread formed on the fastening hole of the magnetic pole.

Effects of Invention

According to the present invention, when the cap is removed from the opening, and a tool bolt is screwed into the female thread of the opening, the tool bolt abuts on the alnico magnet. By continuing to screw the tool bolt as it is, the alnico magnet and the magnetic pole are peeled off from the plate body. In this way, peeling can be easily achieved with one tool bolt.

BRIEF DESCRIPTION OF THE DRAWINGS

FIGS. 1A, 1B and 1C show a magnetic clamp device of one preferred embodiment also referred to herein as Example 1.

FIGS. 2A and 2B show an action.

FIGS. 3A, 3B and 3C are views illustrating another preferred embodiment also referred to herein as Example 2.

FIGS. 4A and 4B are views illustrating a further preferred embodiment also referred to as Example 3.

FIGS. 5B and 5C are views showing a modified portion of the third embodiment also referred to herein as Example 3.

FIGS. 6A, 6B, 6C and 6D are views which show the magnetic flux of the outer circumferential portion of the magnetic pole when the magnetic clamp device is deactivated.

PREFERRED EMBODIMENT OF THE INVENTION

An example of the present invention is described below.

Example 1

Figure 1A:
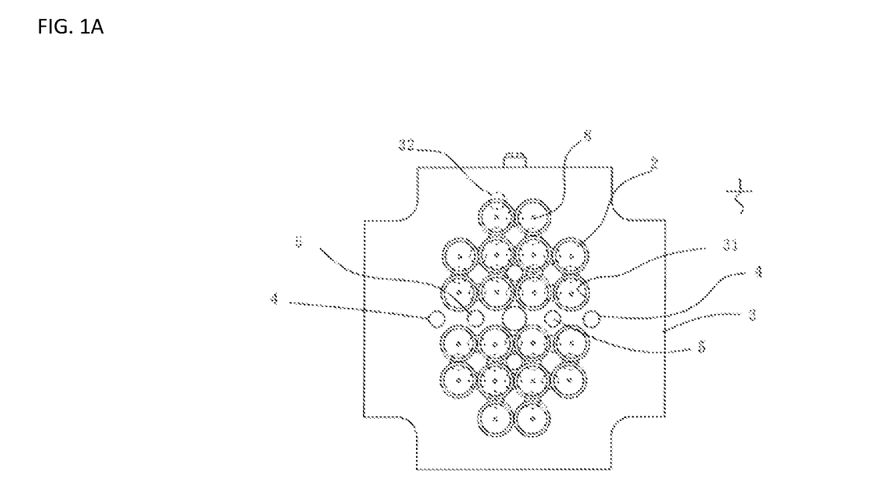
FIG. 1A is a view of the magnetic clamp device viewed from the front side.
Figure 1B:
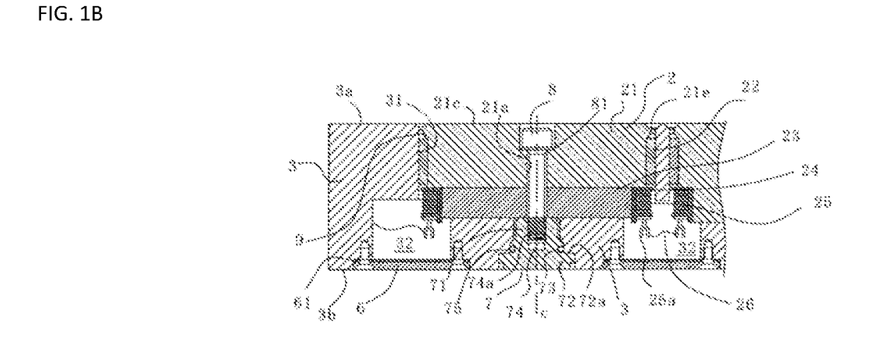
FIG. 1B is a cross-sectional view of one magnetic pad.
Figure 1C:
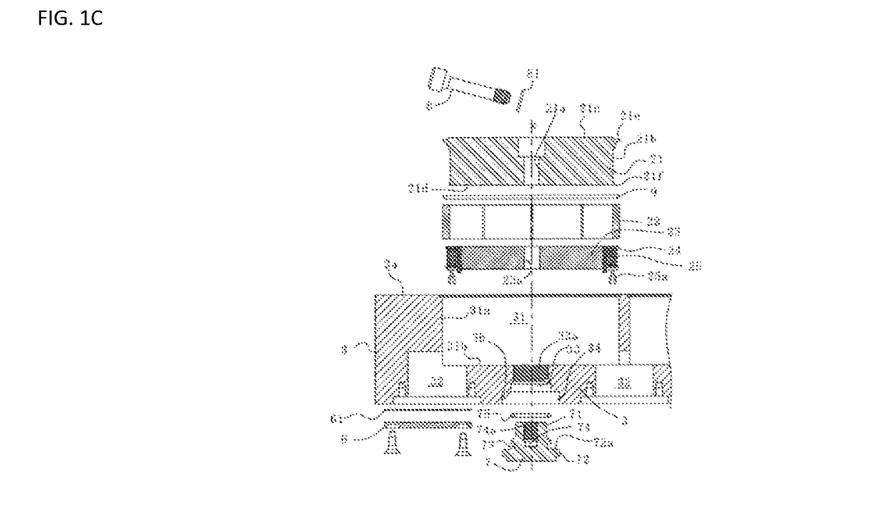
FIG. 1C is an exploded view thereof.

FIGS. 1A, 1B and 1C show a magnetic clamp device 1. FIG. 1A is a view of the magnetic clamp device 1 viewed from the front side, FIG. 1B is a cross-sectional view of a magnetic pad 2, and FIG. 1C is an exploded view of the magnetic pad 2.

In FIG. 1A, the magnetic clamp device 1 has a plate body 3 made of magnetic material and a number of magnetic pads 2 arranged in a bottomed cavity portion 31 provided on the surface of the plate body 3. The surface of the plate body 3 also has a through hole 5 into which a proximity sensor 4 and an ejector rod (not shown) are inserted. A circular dotted line in the figure indicates a space (wiring chamber 32) provided on the back side of the plate body 3. The wiring chambers 32 are arranged in such a way that some of them overlap in common to adjacent cavity portions 31 in a plan view, and necessary cables are connected.

In FIGS. 1B and 1C, the magnetic pad 2 is cylindrical (hereinafter, the center of the magnetic pad 2 is referred to as a central axis c), and has a magnetic pole 21, a magnet with non-reversible polarity (non-reversible magnet, e.g., neodymium magnet 22) around the magnetic pole 21, a magnet with reversible polarity (reversible magnet, e.g., alnico magnet 23) placed on the back side of the magnetic pole 21, a bobbin 24 placed around the alnico magnet 23, and a coil 25 wound on the bobbin 24. The magnetic pole 21 is formed from a ferromagnetic material such as steel. The magnetic pole 21 and the alnico magnet 23 have fastening holes 21a and 23a, respectively, along the central axis c, and the fastening holes 21a and 23a communicate with each other. Bolts 8 are inserted from the front side of the plate body 3 (the side that clamps the mold, the upper side in the figure) and can go through. The fastening holes 21a and 23a are through holes without threads.

The magnetic pole 21 is provided with a neodymium magnet 22 along the wall of its outer circumferential side 21b. The neodymium magnet 22 is polarized in a radial direction of the magnetic pole 21. The neodymium magnet 22 is divided into a plurality of pieces in the circumferential direction, one piece thereof has an arc shape. When the magnetic pad 2 is housed in the cavity portion 31 of the plate body 3, the neodymium magnet 22 is placed so that as little gap as possible is created between the inner circumferential side 31a of the cavity portion 31 and the outer circumferential side 21b of the magnetic pole 21. On the upper side of the neodymium magnet 22, between the magnetic pole 21 and the plate body 3, the outer circumferential portion 21e of the magnetic pole 21 extends until it contacts/approaches the inner circumferential side 31a of the plate body 3 with a thin thickness. A sealing member 9 (O-ring) for sealing to enhance liquid tightness is provided on the lower side of the outer circumferential portion 21e. The outer circumferential portion 21e of the magnetic pole 21 is extended to the inner circumferential side 31a of the cavity portion 31 in order to prevent sealing member 9 from falling off, and the thickness of the outer circumferential portion 21e is made thinner in order to increase the magnetic resistance. Instead of such a configuration, a non-magnetic ring or an annular body as shown in patent literatures 1 and 2 may be utilized.

The alnico magnet 23 is placed on the back side of the magnetic pole 21. With a coil 25 wound around the alnico magnet 23, the alnico magnet 23 forms a magnet whose magnetic polarity can be switched. When the magnetic pad 2 is housed in the cavity portion 31 of the plate body 3, the alnico magnet 23 is placed between the bottom 31b of the cavity portion 31 and the bottom 21d of the magnetic pole 21.

The cavity portion 31 of the plate body 3 is partially connected to the wiring chamber 32. Terminals 25a of coils 25 of the magnetic pad 2 can appear in the wiring chamber 32 by using this connected portion. In the wiring chamber 32, wiring 26 is connected to the terminals 25a of the coils 25, and a required control current can be supplied. The wiring chamber 32 is also used for wiring other electric circuits such as the proximity sensor 4 (not shown). The wiring chamber 32 is fitted with a lid 6 so that it can be closed from the back side of the plate body 3. The lid 6 is attached to the plate body 3 through a gasket 61 to prevent liquid from entering from around the wiring chamber 32 of the plate body 3 and to ensure liquid tightness.

The bottom 31b of the cavity portion 31 facing the magnetic pole 21 is provided with an opening 33 having a circular cross-section that penetrates or extends through the back side of the plate body 3 along the central axis c. The diameter of the opening 33 is larger than the diameters of the fastening holes 21a and 23a. The base portion 71 of the cap 7 is inserted into the opening 33. The cap 7 is formed from magnetic material or non-magnetic material, and has a base portion 71 having a circular cross-section, an O-ring groove 73, and a flange portion 72, from the top of the drawing with the central axis c. In the O-ring groove 73, a sealing member 75 (O-ring) is placed in contact with the inner circumference of the opening 33. The base portion 71 has a bolt hole 74 opening along the central axis c. The bolt hole 74 is non-penetrating, and when the base portion 71 is inserted into the opening 33, the bolt hole 74 is connected to the fastening holes 21a and 23a. The inner circumference of the bolt hole 74 has a female thread 74a into which the bolt 8 is screwed. The flange 72 is provided with a contacting surface 72a that contacts the back side surface 3b of the plate body 3. In the example, a widening portion 34 is provided at the entrance of the opening 33 in order to accommodate the flange 72 on the plate body 3 side and reduce the unevenness of the back side of the plate body 3.

The inner circumference of the opening 33, which is on the bottom 31b side of the cavity portion 31, is provided with a female thread 33a. The range of the inner circumference of the opening 33 provided with the female thread 33a is a part, and is limited to a range that does not interfere with the O-ring 75 of the O-ring groove 73. Although the female thread 33a does not screw with the cap 7, a male thread may be provided on the outer circumference of the base portion 71 of the cap 7 and screwed with the female thread 33a. A sealing member 75 (O-ring) is installed in the O-ring groove 73 to provide a liquid-tight seal with the inner circumference of the opening 33. By using the O-ring 75 to seal the inner circumference of the opening 33, the magnetic pole 21, the alnico magnet 23, the cap 7, and the back side surface 3b of the plate body 3 are fixed in the direction of the central axis c without an elastic body. Therefore, it is easy to make the front side surface 3a of the plate body 3 and the front surface 21c of the magnetic pole 21 uniform. In addition, the bolt 8 fixes the magnetic pole 21 through the sealing member 81 (seal washer).

The polarity of the alnico magnet 23 is reversed by applying a current in one direction from the outside to the coil 25 of the alnico magnet 23. The current should be applied only for the time required to hold the required magnetic flux. When both the alnico magnet 23 and the neodymium magnet 22 have the same magnetic pole with respect to the magnetic pole 21, these magnetic fluxes will pass through the mold when the mold is pressed against the surface 21c of the magnetic pole 21. As a result, a magnetic circuit composed of a neodymium magnet 22, a magnetic pole 21, a mold, and a plate body 3 and a magnetic circuit composed of an alnico magnet 23, a magnetic pole 21, a mold, and a plate body 3 are formed. In this state, the magnetic clamp device 1 is in the operating state (magnetized state). Since the coercive force of the alnico magnet 23 is not relatively high as a permanent magnet, when the mold is momentarily separated, the magnetic force of the alnico magnet 23 is completely or partially canceled by the magnetic force of the neodymium magnet 22, and the clamping force of the magnetic clamp device 1 is lost.

By passing a current in the opposite direction from the outside to the coil 25 of the alnico magnet 23, the alnico magnet 23 generates a new magnetic field in the opposite direction. At this time, the magnetic clamp device 1 is switched to the non-operating state (demagnetized state), and the clamping force exerted on the mold is lost.

Figure 2A:
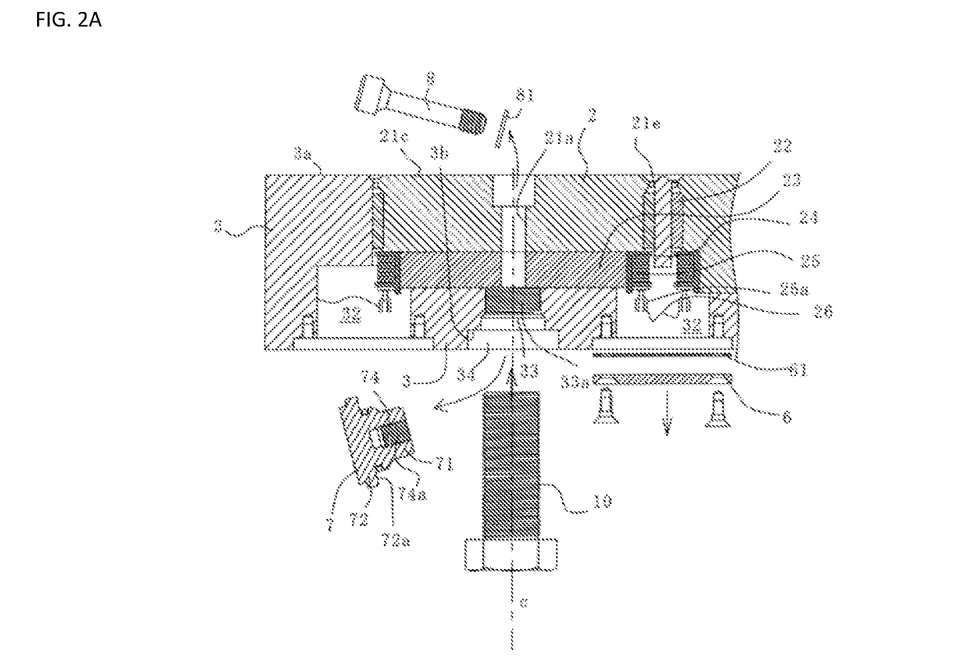
FIG. 2A is a view before peeling.
Figure 2B:
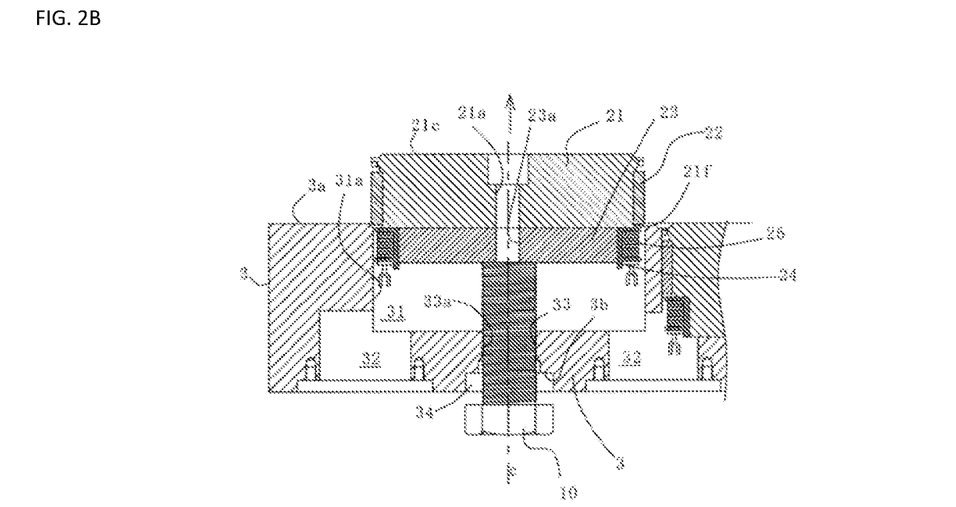
FIG. 2B is a view after peeling.

FIGS. 2A and 2B are views showing the operation of Example 1. FIG. 2A shows a view before peeling off and FIG. 2B shows a view after peeling off. The lid 6 is opened and the wiring 26 of the terminal 25a of the coil 25 is removed. The bolt 8 is unscrewed from the cap 7. When a tool bolt 10 is screwed into the female thread 33a of the opening 33, the tool bolt 10 abuts on the alnico magnet 23. By continuing to screw the tool bolt 10, the tool bolt 10 pulls the alnico magnet 23 and neodymium magnet 22 off the magnetically adsorbed plate body 3. In this way, one tool bolt 10 can be used to easily peel off the magnets. The tool bolt 10 can be made for peeling, or it can be a general bolt of JIS or inch standard that is commercially available. The female thread 33a of the opening 33 should be set so that a general bolt can also be used as the tool bolt 10.

In the example, the neodymium magnet 22 is attracted to the magnetic pole 21 side and comes out of the cavity portion 31 of the plate body 3. This is because a slight protrusion 21f is provided between the bobbin 24 and the neodymium magnet 22 from the side 21b of the magnetic pole 21, and the neodymium magnet 22 is lifted by the movement of the magnetic pole 21. On the other hand, since the bobbin 24 has a larger radial size than the outside of the magnetic pole 21, without the protruding portion 21f, the neodymium magnet 22 remains in the cavity portion 31 and the bobbin 24 cannot be removed due to interference with the neodymium magnet 22.

Depending on the structure of the neodymium magnet 22 and the magnetic pole 21, the neodymium magnet 22 may remain on the plate body 3 side.

Example 2

In Example 1, the fastening holes 21a and 23a are provided to penetrate the magnetic pole 21 and the alnico magnet 23, and the bolt 8 penetrates the magnetic pole 21 and the alnico magnet 23 from the magnetic pole 21 side through the fastening holes 21a and 23a, and is screwed into the cap 7 to be fixed to the plate body 3. On the other hand, in Example 2, on the contrary, the bolt 8 penetrates through the bolt hole 74 of the cap 7 and the fastening hole 23a of the alnico magnet 23 from the back side of the plate body 3, and is screwed to the magnetic pole 21.

Figure 3A:
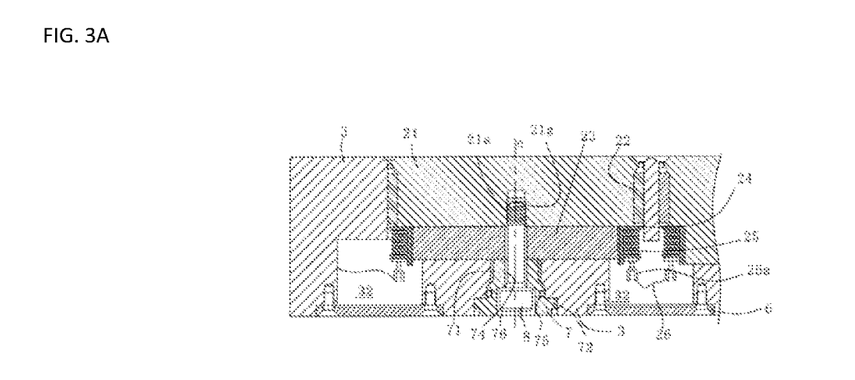
FIG. 3A is a cross-sectional view.
Figure 3B:
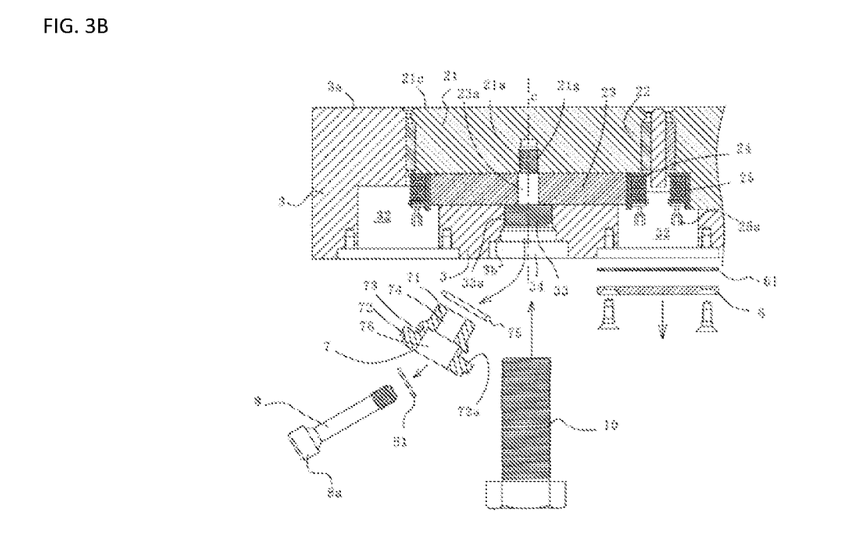
FIG. 3B is a view before peeling.
Figure 3C:
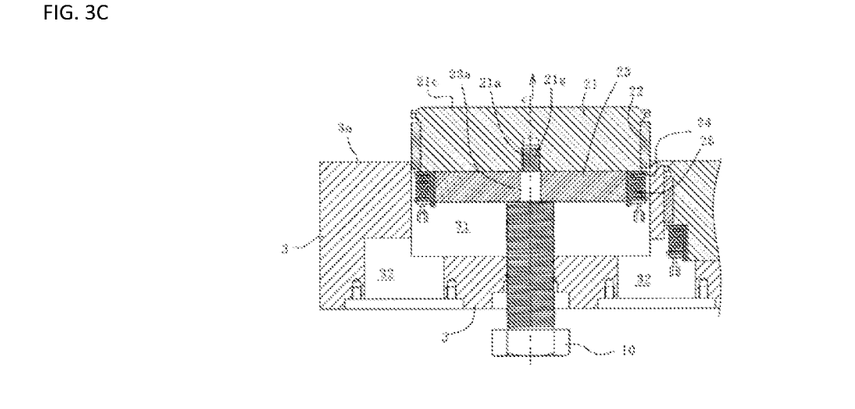
FIG. 3C is a view after peeling.

In embodiment depicted in FIGS. 3A, 3B and 3C, FIG. 3A is a cross-sectional view, FIG. 3B is a view before peeling off, and FIG. 3C is a view after peeling off. The same reference signs are placed on the configurations that have the same functions as those in Example 1.

In FIG. 3A, the magnetic pad 2 of Example 2 is different from the magnetic pad 2 of Example 1 in the configuration of the magnetic pole 21 and the cap 7, and the mounting direction of the bolt 8. On the magnetic pole 21, a fastening hole 21a, which is a stop hole, is formed from the back side. The fastening hole 21a is provided with a female thread 21g into which the bolt 8 is screwed. On the other hand, the bolt hole 74 does not have a female thread 74a and communicates with a dowel hole 76, which has a diameter larger than that of the bolt hole 74, to form a through hole extending completely through the cap 7. The bolt 8 can be inserted through the bolt hole 74 and the dowel hole 76 from the back side of the plate body 3. In this example, the fastening hole 23a and the bolt hole 74 are a through hole. The dowel hole 76 can accommodate a head portion 8a of the bolt 8.

Referring to FIGS. 3A to 3C, the operation of Example 2 will be described. First, the lid 6 is opened, and the wiring 26 of the terminal 25a of the coil 25 is removed. The bolt 8 is unscrewed from the magnetic pole 21. When the tool bolt 10 is screwed into the female thread 33a of the opening 33, the tool bolt 10 abuts on the alnico magnet 23. By continuing to screw the tool bolt 10, the alnico magnet 23 and the magnetic pole 21 are peeled off from the plate body 3. In this way, one tool bolt 10 can be used to easily peel off the magnets.

In the above Examples 1 and 2, after removing the magnetic pad 2 from the plate body 3, necessary maintenance is performed on the coil 25 and other parts, the magnetic pad 2 is attached on the plate body 3 to be fastened with the bolt 8. Wiring in the wiring chamber 32 is performed, and the lid 6 is closed. If necessary, the plate body 3 and the alnico magnet 23 are polished.

In the above Examples 1 and 2, although the base portion 71 is cylindrical, the shape of the flange portion 72 in a plan view need not be circular. In addition, instead of the O-ring groove 73 of the cap 7, a sealing member such as a gasket may be used between the contacting surface 72a and the surface 3b on the plate body side to which it contacts. However, in this case, since it is difficult to make the surface 3a of the plate body 3 and the surface 21c of the magnetic pad 2 uniform due to the elasticity of such a sealing member, care must be taken during polishing.

Example 3

Figure 4A:
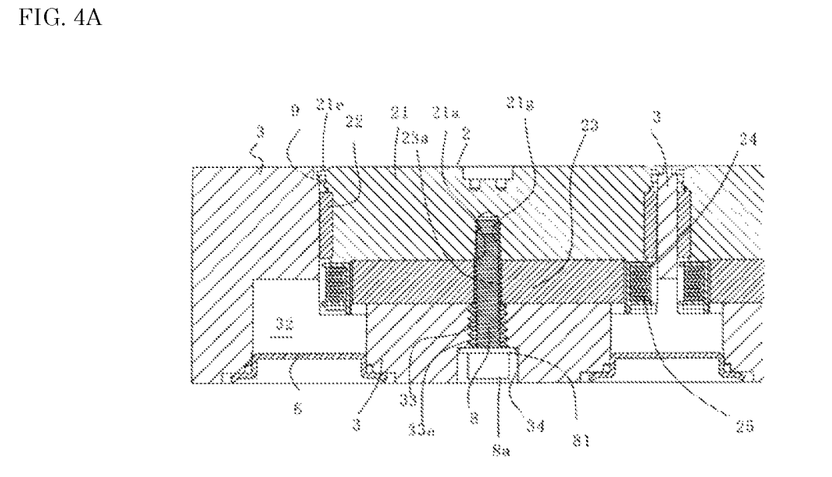
FIG. 4A is a cross-sectional view.
Figure 4B:
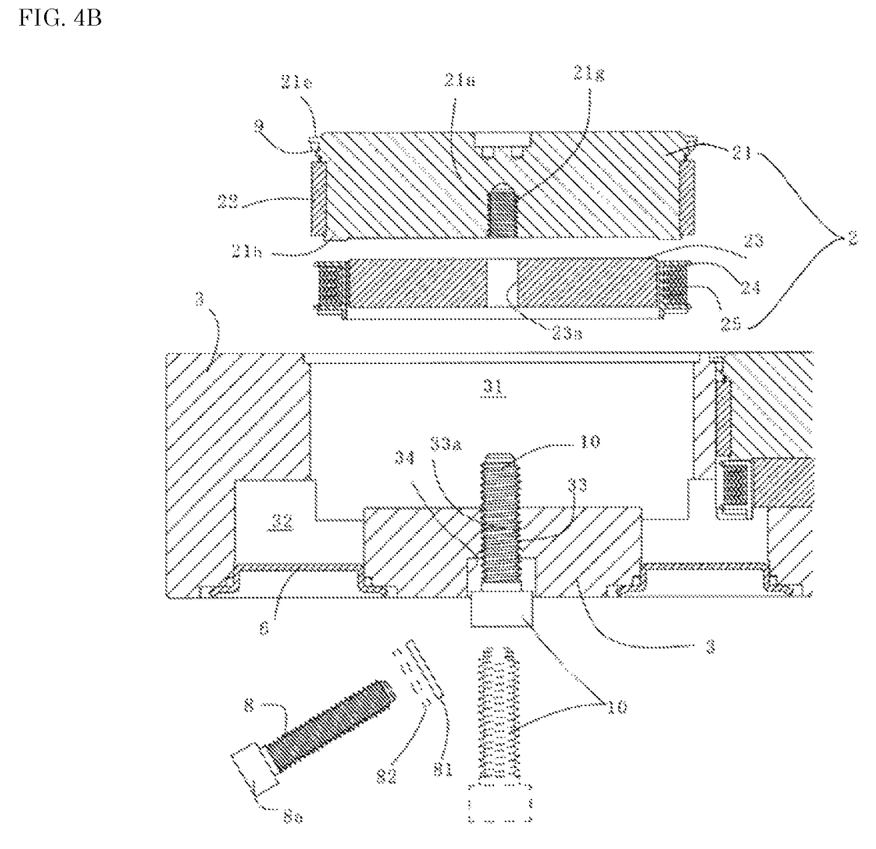
FIG. 4B is a view after peeling.

The magnetic clamp device 1 of Example 3 shown in FIGS. 4A and 4B is an example in which the magnetic pole 21 is connected to the plate body 3 with the bolt 8 penetrating from the back side of the plate body 3 through the fastening hole 23a of the alnico magnet 23. Unlike the magnetic clamp device 1 of Example 2, the cap 7 is not included.

A fastening hole 21a, which is a stopping hole, is formed in the magnetic pole 21 from the back surface side. The fastening hole 21a has a female thread 21g into which the bolt 8 is screwed. The fastening hole 23a of the alnico magnet 23 is a threadless through hole through which the bolt 8 can penetrate. The diameter of the opening 33a of the plate body 3 is set to be larger than that of the fastening hole 21a or the fastening hole 23a. Therefore, the head portion 8a of the bolt 8 or a washer 82 used together with the bolt 8 as needed cannot penetrate. In addition, a female thread is formed on the inner circumference of the opening 33a. The fastening hole 21a, the fastening hole 23a and the opening 33a communicate with each other in a straight line. A widening portion 34 is provided at the entrance of the opening 33a on the back side of the plate body 3. The widening portion 34 is large enough to house the head portion 8a of the bolt 8 screwed into the female thread 21g from the back side of the plate body 3 and to reduce the unevenness of the back side of the plate body 3.

On the magnetic pole 21 side, there is a cylindrical guide 21h with a slightly convex bottom. The inner circumference of the cylindrical guide 21h is slightly larger than the outer circumference of the alnico magnet 23. The upper part of the alnico magnet 23 enters into the cylindrical guide 21h, thereby roughly defining the positional relationship between the two. The cylindrical guide 21h is used in the assembly process to fix the neodymium magnet 22, the magnetic pole 21, and the alnico magnet 23 to the plate body 3. To show a specific assembly process, the alnico magnet 23 is placed in the cylindrical guide 21h, and then the magnetized neodymium magnet 22 is attached to the magnetic pole 21. Then, the alnico magnet 23 is attracted to the magnetic pole 21 by the magnetic force of the neodymium magnet 22 and integrated. At this time, the fastening hole 23a of the alnico magnet 23 and the fastening hole 21a of the magnetic pole 21 are also automatically in a communicating state by the cylindrical guide 21h. Since the neodymium magnet 22, the magnetic pole 21, and the alnico magnet 23 can be handled as one integrated component after that, the screwing with the bolt 8 can be performed by one worker.

Figure 5A:
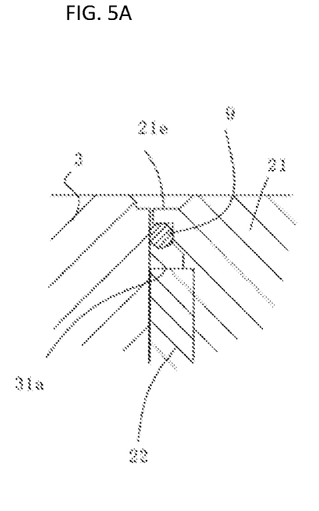
FIG. 5A is a partially enlarged view of Example 1 or Example 2.
Figure 5B:
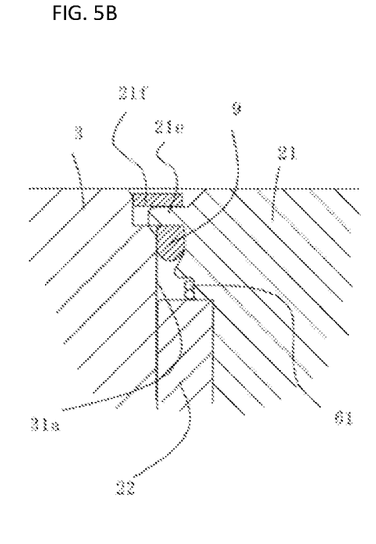
FIG. 5B is a partially enlarged view of Example 3.
Figure 5C:
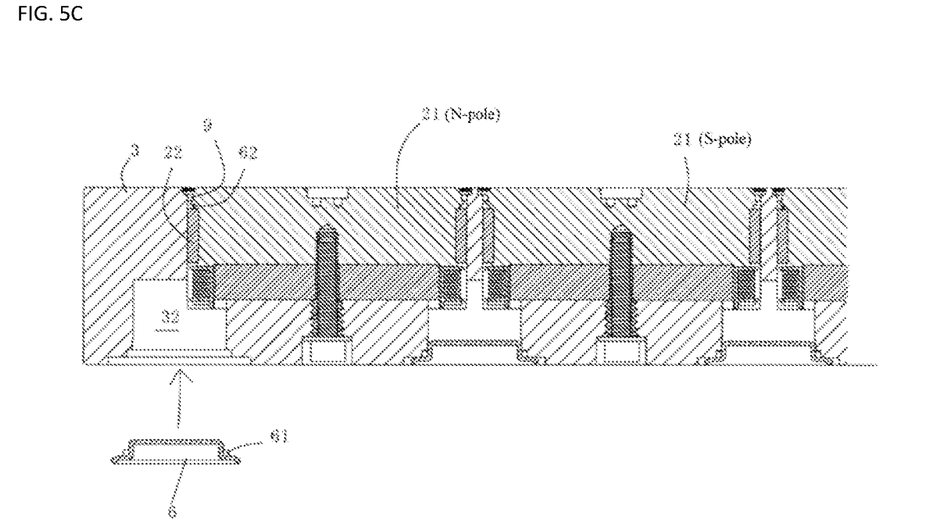
FIG. 5C is a view showing a plurality of magnetic poles.

FIGS. 5B and 5C are views illustrating a portion of the magnetic clamp device 1 of Example 3, which has been changed as compared with Example 1 or Example 2. In Example 1 or Example 2, as shown in FIG. 5A, the upper side of the neodymium magnet 22 extends until the outer circumferential portion 21e of the magnetic pole 21 contacts/approaches the inner circumferential side 31a of the plate body 3 with a thin thickness. On the other hand, in Example 3, as shown in FIG. 5B, the outer circumferential portion 21e of the magnetic pole 21 exceeds the inner circumferential side 31a of the plate body 3 and slightly covers it. Then, a shim 21f that magnetically connects the outer circumferential portion 21e and the plate body 3 is covered with the outer circumferential portion 21e and is in contact with the plate body 3.

Further, in FIG. 5C, the lid 6 is fitted into the wiring chamber 32 by elastic force. Further, the sealing member is attached to the lid 6 in advance. The installation work of the lid 6 to the plate body 3 is simplified by only fitting it. Further, a search coil 62 for measuring the magnetic flux passing through the magnetic pole 21 is wound around the magnetic pole 21 for several turns between the neodymium magnet 22 and the sealing member 9. In the present example, the adjacent magnetic poles 21 are magnetized to different magnetic poles. Assuming that the left magnetic pole 21 on the drawing in FIG. 5C is N-pole, the right magnetic pole 21 is S-pole. In this case, the search coil 62 may be wound around all of the magnetic poles 21. On the other hand, it may be wound on some of the magnetic poles 21 and not on the others. For example, it may be wound only on the N-pole magnetic pole 21 and not on the S-pole magnetic pole 21.

Next, the operation of Example 3 will be explained with reference to FIGS. 4A and 4B. The bolt 8 and the magnetic pole 21 are unscrewed. When the tool bolt 10 is screwed into the female thread 33a of the opening 33, the tool bolt 10 abuts on the alnico magnet 23. By continuing to screw the tool bolt 10, the alnico magnet 23 and the magnetic pole 21 are peeling off from the plate body 3. In this way, it is possible to peel off easily with one tool bolt 10.

Example 4

Figure 6A:
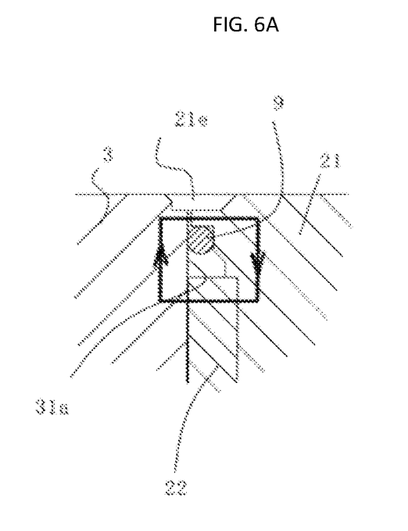
FIG. 6A shows a magnetic flux of the outer circumferential portion in Example 1 or Example 2.
Figure 6B:
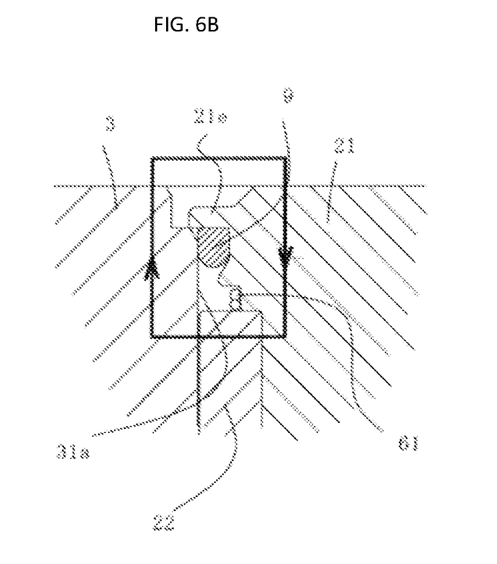
FIG. 6B and FIG. 6C show a magnetic flux of the outer circumferential portion in Example 3.
Figure 6C:
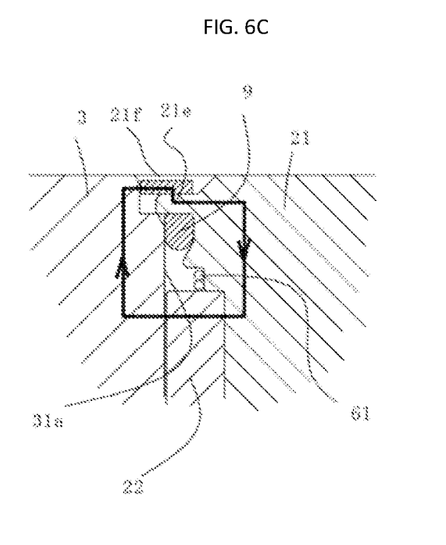
Figure 6D:
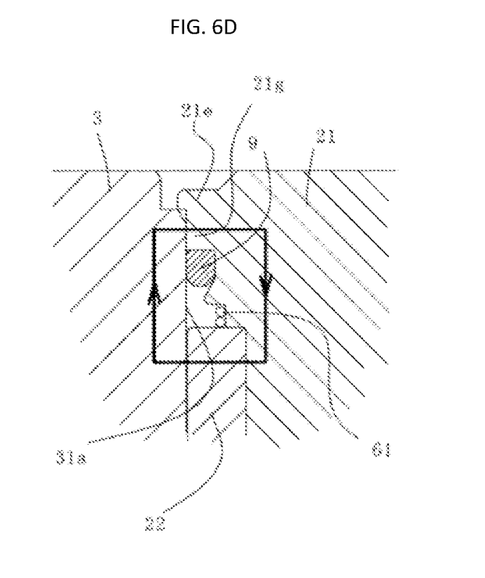
FIG. 6D shows a magnetic flux of the outer circumferential portion in Example 4.

Example 4 shown in FIG. 6D is a slight modification of Example 3. Instead of the shim 21f that magnetically connects the outer circumferential portion 21e and the plate body 3, a short-circuit portion 21g that magnetically short-circuits to the plate body 3 is provided on the lower side of the outer circumferential portion 21e. Other configurations are the same as in Example 3. FIGS. 6A, 6B, 6C and 6D compare the state of the magnetic flux on the outer circumferential portion of the magnetic pole 21 when the magnetic clamp device 1 is in the non-operating state. FIG. 6A corresponds to Examples 1 and 2. The outer circumferential portion 21e is magnetically connected to the plate body 3, and in the non-operating state, the magnetic flux passes between the outer circumferential portion 21e and the plate body 3.

Although FIGS. GB and GC show Example 3, in FIG. GB, the shim 21f is removed. Without the shim 21f, the magnetic flux leaks out of the magnetic pole 21 in the non-operating state. This means that the mold cannot be released successfully. On the other hand, by providing the shim 21f as shown in FIG. GC, the magnetic flux passes through the shim 21f and does not leak out of the magnetic pole 21. In FIG. 6D showing Example 4, the magnetic flux passes through the short-circuit portion 21g on the lower side of the outer circumferential portion 21e and does not leak out of the magnetic pole 21.

DESCRIPTION OF SYMBOLS 1 magnetic clamp device
2 magnetic pad
3 plate body
4 proximity sensor
5 through hole
6 lid
7 cap
8 bolt
9 sealing member
10 tool bolt 20 permanent magnet
21 magnetic pole
22 neodymium magnet
23 alnico magnet
24 bobbin
25 coil
31 cavity portion
32 wiring chamber
33 opening
34 widening portion
61 gasket
62 search coil
71 base portion
72 flange portion
73 O-ring groove
74 bolt hole
75 sealing member
76 dowel hole
81 sealing member
82 washer

The invention claimed is:

1. A magnetic clamp device comprising a plate body made of magnetic material having a cavity portion formed in a surface of the plate body, and a magnetic pad disposed in the cavity portion, said magnetic pad having a magnetic pole, a reversible magnet with reversible polarity disposed between the magnetic pole and a bottom of the cavity portion, and a non-reversible magnet disposed between the magnetic pole and an inner circumferential side of the cavity portion, wherein said magnetic pole and said reversible magnet each have a fastening hole communicating with each other, and said cavity portion having an opening that extends from the bottom of the cavity portion to a back side of the plate body, said opening having a diameter larger than a diameter of each fastening hole of said magnetic pole and said reversible magnet, wherein a cap having a base portion that has a bolt hole communicating with each fastening hole of said magnetic pole and said reversible magnet and a flange portion that abuts a surface of the back side of the plate body is inserted into the opening, and wherein a bolt inserted into each fastening hole of the magnetic pole and the non-reversible magnet from a front side of the magnetic pad is screwed into a female thread provided on the bolt hole of the cap, and wherein a female thread is provided on an inner circumference of the opening.

2. The magnetic clamp device according to claim 1, further comprising, a sealing member that seals a front side of the non-reversible magnet between the magnetic pole and the inner circumferential side, and another sealing member that seals between the base portion and an inner circumferential side of the opening.

3. A magnetic clamp device comprising a plate body made of magnetic material having a cavity portion formed in a surface of the plate body, and a magnetic pad disposed in the cavity portion, said magnetic pad having a magnetic pole, a reversible magnet with reversible polarity disposed between the magnetic pole and a bottom of the cavity portion, and a non-reversible magnet disposed between the magnetic pole and an inner circumferential side of the cavity portion, wherein said magnetic pole and said reversible magnet each have a fastening hole communicating with each other, and said cavity portion has an opening that extends from the bottom of the cavity portion to a back side of the plate body, said opening having a diameter larger than a diameter of each fastening hole of said magnetic pole and said reversible magnet, wherein a cap having a base portion that has a bolt hole communicating with each fastening hole of said magnetic pole and said reversible magnet and a flange portion that abuts a surface of the back side of the plate body is inserted into the opening, and wherein the bolt hole extends into the back side of the plate body, and a bolt inserted into the bolt hole and a fastening hole of the non-reversible magnet from a flange portion side of the cap is screwed into a female thread provided on the fastening hole of the magnetic pole, wherein a female thread is provided on an inner circumference of the opening.

4. A magnetic clamp device comprising a plate body made of magnetic material with a cavity portion formed in a surface of the plate body, and a magnetic pad disposed in the cavity portion, said magnetic pad having a magnetic pole, a reversible magnet with reversible polarity disposed between the magnetic pole and a bottom of the cavity portion, and a non-reversible magnet disposed between the magnetic pole and an inner circumferential side of the cavity portion, wherein said magnetic pole and said reversible magnet respectively each have a fastening hole communicating with each other, and said cavity portion has an opening that extends from the bottom of the cavity portion to a back side of the plate body, said opening having a diameter larger than a diameter of each fastening hole of said magnetic pole and said reversible magnet, wherein on the one hand, the fastening hole of the magnetic pole is provided with a female thread, and a bolt inserted from the back side of the plate body through the opening and the fastening hole of the reversible magnet and screwed to fix the magnetic pole and the reversible magnet to the plate body, and on the other hand, a female thread is provided on an inner circumference of the opening, and a widening portion that houses a head portion of the bolt is provided at an entrance on a surface of the back side of the plate body, and the bolt is not screwed into the female thread of the inner circumference of the opening.

* * * * *